United States Patent [19]

Brignac et al.

[11] Patent Number: 5,985,136
[45] Date of Patent: Nov. 16, 1999

[54] TWO STAGE HYDRODESULFURIZATION PROCESS

[75] Inventors: Garland B. Brignac, Clinton, La.; Jeffrey L. Kaufman, Kingwood, Tex.; John C. Coker, Baton Rouge, La.

[73] Assignee: Exxon Research and Engineering Co., Florham Park, N.J.

[21] Appl. No.: 09/099,626

[22] Filed: Jun. 18, 1998

[51] Int. Cl.⁶ .......................... C10G 25/00; C10G 45/08
[52] U.S. Cl. ................. 208/216 R; 208/210; 208/213; 208/217
[58] Field of Search ................. 208/210, 213, 208/216 R, 217

[56] References Cited

U.S. PATENT DOCUMENTS

| | | | |
|---|---|---|---|
| 4,016,067 | 4/1977 | Fischer et al. | 208/89 |
| 4,657,663 | 4/1987 | Gardner et al. | 208/210 |
| 4,665,048 | 5/1987 | Van Leeuwen et al. | 502/221 |
| 5,266,188 | 11/1993 | Kukes et al. | 208/216 R |
| 5,423,975 | 6/1995 | Sudhakar et al. | 208/216 R |
| 5,676,882 | 10/1997 | Sudhakar | 208/143 |
| 5,770,046 | 6/1998 | Sudhakar | 208/216 R |

*Primary Examiner*—Walter D. Griffin
*Assistant Examiner*—Tam M. Nguyen
*Attorney, Agent, or Firm*—Henry E. Naylor

[57] ABSTRACT

A process for hydrodesulfurizing naphtha feedstreams wherein the reactor inlet temperature is below the dew point of the feedstock at the reactor inlet so that the naphtha will completely vaporize within the catalyst bed. It is preferred to use a catalyst comprised of about 1 to about 10 wt. % $MoO_3$, about 0.1 to about 5 wt. % CoO supported on a suitable support material. They are also characterized as having an average medium pore diameter from about 60 Å to 200 Å. a Co/Mo atomic ratio of about 0.1 to about 1.0, a $MoO_3$ surface concentration of about $0.5 \times 10^{-4}$ to about $3.0 \times 10^{-4}$ g $MoO_3/m^2$, and an average particle size of less than about 2.0 mm in diameter.

13 Claims, 2 Drawing Sheets

TWO STAGE HYDRODESULFURIZATION PROCESS

FIELD OF THE INVENTION

The present invention relates to a two stage process for hydrodesulfurizing naphtha feedstreams wherein the first stage contains a catalyst comprised of about 1 to about 10 wt. % $MoO_3$, about 0.1 to about 5 wt. % CoO supported on a suitable support material. They are also characterized as having an average medium pore diameter from about 60 Å to 200 Å, a Co/Mo atomic ratio of about 0.1 to about 1.0, a $MoO_3$ surface concentration of about $0.5\times10^{-4}$ to about $3.0\times10^{-4}$ g $MoO_3/m^2$, and an average particle size of less than about 2.0 mm in diameter; and the second stage contains a conventional hydrodesulfurization catalyst comprised of at least one Group VIII metal and at least one Group VI metal on an inorganic oxide support.

BACKGROUND OF THE INVENTION

Naphtha streams are primary products in any petroleum refinery in the United States. These streams are blended to makeup what is referred to in the industry as the "gasoline pool". One problem associated with such streams, especially those naphtha streams which are products of a cracking process, such as fluidized catalytic cracking and coking, is that they contain relatively high levels of undesirable sulfur. They also contain valuable olefins which contribute to the octane number of the resulting gasoline pool, and thus it is highly desirable not to saturate them to lower octane paraffins during processing. There is a continuing need for catalysts having ever improved properties with respect to the desulfurization of naphtha streams so that the sulfur level of such streams can be brought to the ever lower levels required by ever stricter governmental regulations. Research over the last couple of decades has resulted in a great many hydrodesulfurization catalysts and processes for desulfurizing naphtha feed streams, while attempting to keep olefin saturation at a minimum. While there are commercially successful naphtha hydrodesulfurization catalysts in use today, there is a continuing need for improved catalysts that are capable of combining optimum hydrodesulfurization with minimum hydrogenation of olefin.

SUMMARY OF THE INVENTION

In accordance with the present invention, there is provided a two stage process for hydrodesulfurizing a naphtha feedstock, which process comprises:
  i) reacting said feedstock in a first reaction stage under hydrodesulfurization conditions in contact with a catalyst is comprised of:
    (a) about 1 to 10 wt. % $MoO_3$; and
    (b) about 0.1 to 5 wt. % CoO; and
    (c) a Co/Mo atomic ratio of about 0.1 to 1.0; and
    (d) a median pore diameter of about 60 Å to 200 Å; and
    (e) a $MoO_3$ surface concentration in g $MoO_3/m^2$ of about $0.5\times10^{-4}$ to $3\times10^{-4}$; and
    (f) an average particle size diameter of less than about 2.0 mm; and
  ii) passing the reaction product of the first stage to a second stage, also operated under hydrodesulfurization conditions, and in contact with a catalyst comprised of at least one Group VIII metal selected from the group consisting of Co and Ni, and at least one Group VI metal selected from the group consisting of Mo and W, more preferably Mo, on an inorganic oxide support material.

In a preferred embodiment of the present invention the catalyst has a metals sulfide edge plane area from about 800 to 2800 μmol oxygen/g $MoO_3$ as measured by oxygen chemisorption.

In another preferred embodiment of the present invention the Group VIII metal is Ni and the Group VI metal is Mo.

In another preferred embodiment of the present invention, the process conditions of hydrodesulfurization are such that the inlet temperature of the feedstock to the reaction unit is below the dew point of the feedstock and 100% of the feedstock becomes vaporized in the catalyst bed.

In other preferred embodiments of the present invention, the $MoO_3$ surface concentration in g $MoO_3/m^2$ is about $0.75\times10^{-4}$ to $2.5\times10^{-4}$; the Co/Mo atomic ratio is from about 0.20 to 0.85; and the mean pore diameter is from about 75 Å to about 175 Å.

DETAILED DESCRIPTION OF THE INVENTION

Figure 1:
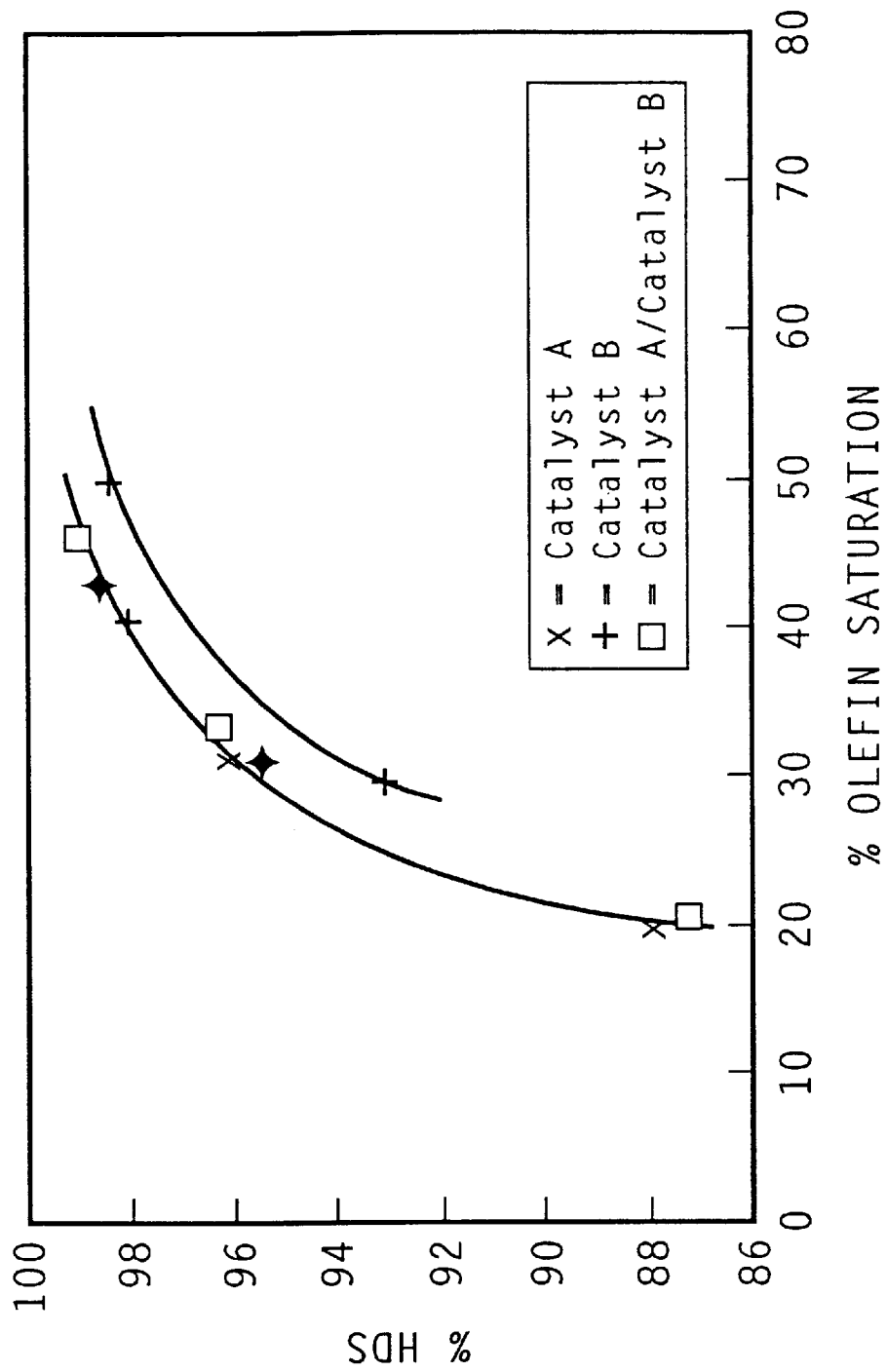
FIG. 1 is a plot of percent hydrodesulfurization versus percent olefin saturation for the examples presented in Example 11 hereof.

Naphtha feedstocks suitable for use in the present invention can comprise any one or more refinery streams boiling in the range from about 50° F. to about 450° F., at atmospheric pressure. The naphtha feedstock generally contains cracked naphtha which usually comprises fluid catalytic cracking unit naphtha (FCC catalytic naphtha), coker naphtha, hydrocracker naphtha, resid hydrotreater naphtha, debutanized natural gasoline (DNG), and gasoline blending components from other sources wherein a naphtha boiling range stream can be produced. FCC catalytic naphtha and coker naphtha are generally more olefinic naphthas since they are products of catalytic and/or thermal cracking reactions, and are the more preferred streams for use in the present invention.

The naphtha feedstock, preferably a cracked naphtha feedstock, generally contains not only paraffins, naphthenes, and aromatics, but also unsaturates, such as open-chain and cyclic olefins, dienes, and cyclic hydrocarbons with olefinic side chains. The cracked naphtha feedstock generally comprises an overall olefins concentration ranging as high as about 60 wt. %, more typically as high as about 50 wt. %, and most typically from about 5 wt. % to about 40 wt. %. The cracked naphtha feedstock can comprise a diene concentration of as much as 15 wt. %, but more typically ranges from about 0.02 wt. % to about 5 wt. % of the feedstock. High diene concentrations can result in a gasoline product with poor stability and color. The cracked naphtha feedstock sulfur content will generally range from about 0.05 wt. % to about 0.7 wt. % and more typically from about 0.07 wt. % to about 0.5 wt. % based on the total weight of the feedstock. Nitrogen content will generally range from about 5 wppm to about 500 wppm, and more typically from about 20 wppm to about 200 wppm.

There are many hydrodesulfurization catalysts in the prior art that are similar to those used in the first stage of the present invention, but none can be characterized as having all of the unique properties, and thus the level of activity for hydrodesulfurization in combination with the relatively low olefin saturation, as those of the instant invention. For example, some conventional hydrodesulfurization catalysts typically contain $MoO_3$ and $CoO$ levels within the range of those instantly claimed. Other hydrodesulfurization catalysts have surface areas and pore diameters in the range of the instant catalysts. Only when all of the properties of the instant catalysts are present can such a high degree of hydrodesulfurization in combination with such low olefin saturation be met. The properties which are critical to the catalysts of the present invention include: (a) a $MoO_3$ concentration of about 1 to 10 wt. %, preferably about 2 to 8 wt. %, and more preferably about 4 to 6 wt. %, based on the total weight of the catalyst; (b) a CoO concentration of about 0.1 to 5 wt. %, preferably about 0.5 to 4 wt. %, and more preferably about 1 to 3 wt. %, also based on the total weight of the catalyst; (c) a Co/Mo atomic ratio of about 0.1 to about 1.0, preferably from about 0.20 to about 0.80, more preferably from about 0.25 to about 0.72; (d) a median pore diameter of about 60X to about 200 Å, preferably from about 75 Å to about 175 Å, and more preferably from about 80 Å to about 150 Å; (e) a $MoO_3$ surface concentration of about $0.5 \times 10^{-4}$ to about $3 \times 10^{-4}$ g. $MoO_3/m^2$, preferably about $0.75 \times 10^{-4}$ to about $2.5 \times 10^{-4}$, more preferably from about $1 \times 10^{-4}$ to about $2 \times 10^{-4}$; and (f) an average particle size diameter of less than 2.0 mm, preferably less than about 1.6 mm, more preferably less than about 1.4 mm, and most preferably as small as practical for a commercial hydrodesulfurization process unit. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity", S. J. Tauster et al., *Journal of Catalysis* 63, pp 515–519 (1980), which is incorporated herein by reference. The Oxygen Chemisorption Test involves edge-plane area measurements made wherein pulses of oxygen are added to a carrier gas stream and thus rapidly traverse the catalyst bed. For example, the oxygen chemisorption will be from about 800 to 2,800, preferably from about 1,000 to 2,200, and more preferably from about 1,200 to 2,000 μmol oxygen/gram $MoO_3$. The terms hydrotreating and hydrodesulfurization are sometimes used interchangably in this document.

The catalysts for both the first and second stage reaction zones of the present invention are supported catalysts. Any suitable inorganic oxide support material may be used for the catalyst of the present invention. Non-limiting examples of suitable support materials include: alumina, silica, titania, calcium oxide, strontium oxide, barium oxide, carbons, zirconia, diatomaceous earth, lanthanide oxides including cerium oxide, lanthanum oxide, neodynium oxide, yttrium oxide, and praesodynium oxide; chromia, thorium oxide, urania, niobia, tantala, tin oxide, zince oxide, and aluminum phosphate. Preferred are alumina, silica, and silica-alumina. More preferred is alumina. For the catalysts with a high degree of metal sulfide edge plane area of the present invention, magnesia can also be used. It is to be understood that the support material can contain small amount of contaminants, such as Fe, sulfates, silica, and various metal oxides which can be present during the preparation of the support material. These contaminants are present in the raw materials used to prepare the support and will preferably be present in amounts less than about 1 wt. %, based on the total weight of the support. It is more preferred that the support material be substantially free of such contaminants. It is an embodiment of the present invention that about 0 to 5 wt. %, preferably from about 0.5 to 4 wt. %, and more preferably from about 1 to 3 wt. %, of an additive be present in the support, which additive is selected from the group consisting of phosphorus and metals or metal oxides from Group IA (alkali metals) of the Periodic Table of the Elements.

The hydrodesulfurization process of the present invention will typically begin with a cracked naphtha feedstock preheating step. That is, the chargestock is preheated in feed/effluent heat exchangers prior to entering a furnace for final preheating to a targeted reaction zone inlet temperature. The feedstock can be contacted with a hydrogen-containing stream prior to, during, and/or after preheating. The hydrogen-containing stream can also be added in the hydrodesulfurization reaction zone. The hydrogen stream can be pure hydrogen or can be in admixture with other components found in refinery hydrogen streams. It is preferred that the hydrogen-containing stream have little, if any, hydrogen sulfide. The hydrogen stream purity should be at least about 50% by volume hydrogen, preferably at least about 65% by volume hydrogen, and more preferably at least about 75% by volume hydrogen for best results.

Each reaction stage can consist of one or more fixed bed reactors each of which can comprise a plurality of catalyst beds. Since some olefin saturation will take place, and olefin saturation and the desulfurization reaction are generally exothermic, consequently interstage cooling between fixed bed reactors, or between catalyst beds in the same reactor shell, can be employed. A portion of the heat generated from the hydrodesulfurization process can be recovered and where this heat recovery option is not available, cooling may be performed through cooling utilities such as cooling water or air, or through use of a hydrogen quench stream. In this manner, optimum reaction temperatures can be more easily maintained.

The process of the present invention, for both stages, generally operates at a liquid hourly space velocity of from about 0.5 $hr^{-1}$ to about 15 $hr^{-1}$, preferably from about 0.5 $hr^{-1}$ to about 10 $hr^{-1}$, and most preferably from about 2 $hr^{-1}$ to about 10 $hr^{-1}$.

The most preferred mode of performing the hydrodesulfurization in the first reaction stage is to use a reactor inlet temperature below the dew point of the feedstock so that the naphtha fraction will not be completely vaporized at the reactor inlet. As the hydrodesulfurization reaction begins when the naphtha feed contacts the catalyst, some of the exothermic heat of reaction is absorbed by the endothermic heat of vaporization, thus achieving 100% vaporization within the bed (dry point operation). By transferring some of the heat of reaction to vaporization, the overall temperature rise across the reactor is moderated, thus reducing the overall extent of olefin hydrogenation with only small reductions in hydrodesulfurization. The degree of vaporization is defined by the ratio of the inlet dew point temperature ($T_{DP}$, R) of the naphtha feedstock to the reactor inlet temperature ($T_{IN}$, R), where R is the absolute temperature in degrees Rankine. The dew point temperatures can be calculated by computer software programs, such as Pro/II, available from Simulation Sciences Inc. In the present configuration, the $T_{DP}/T_{IN}$ ratio should be greater than or equal to 0.990, but less than the ratio at which dry point operation is not achieved within the catalyst bed. That is, the ratio extends up to the point at which the operation stays all mixed phase in the reactor. The ratio limit may vary some-what depending on selected operating conditions. The 0.990 ratio is specified to account for uncertainties in the measurement of the inlet temperature including variance in the location of the temperature measurement and uncertainties in the calculation of the actual dew point; however, the naphtha feedstock should not be completely vaporized at the reactor inlet.

The metals of the catalyst for both reaction stages of the present invention can be deposited or incorporated upon the support by any suitable conventional means, such as by impregnation employing heat-decomposable salts of the Group VIB and VIII metals or other methods known to those skilled in the art such as ion-exchange, with impregnation methods being preferred. Suitable aqueous impregnation solutions include, but are not limited to cobalt nitrate, ammonium molybdate, nickel nitrate, and ammonium metatungstate.

Impregnation of the hydrogenation metals on the catalyst support using the above aqueous impregnation solutions can be performed using incipient wetness techniques. The catalyst support is precalcined and the amount of water to be added to just wet all of the support is determined. The aqueous impregnation solutions are added such that the aqueous solution contains the total amount of hydrogenation component metal(s) to be deposited on the given mass of support. Impregnation can be performed for each metal separately, including an intervening drying step between impregnations, or as a single co-impregnation step. The saturated support can then be separated, drained, and dried in preparation for calcination. Calcination generally is performed at a temperature of from about 480° F. to about 1,200° F., or more preferably from about 800° F. to about 1,100° F.

Hydrodesulfurization of the naphtha feedstocks of the present invention for both reaction stages may be performed under the following conditions:

| Conditions | Broad | Preferred |
| --- | --- | --- |
| Temp (° F.) | 450–700 | 500–670 |
| Total Press (psig) | 200–800 | 200–500 |
| $H_2$ Feed Rate SCF/B[1] | 200–5000 | 1500–3000 |
| $H_2$ Purity v% | 50–100 | 65–100 |
| LHSV[2] | 0.5–15 | 0.5–10 |

[1] Standard Cubic Feed per Barrel
[2] Liquid Hourly Space Velocity

Reaction pressures and hydrogen circulation rates below these ranges can result in higher catalyst deactivation rates resulting in less effective selective hydrotreating. Excessively high reaction pressures increase energy and equipment costs and provide diminishing marginal benefits.

The following examples are presented to illustrate the invention and should not be considered limiting in any way.

EXAMPLE 1

A solution was prepared by dissolving 8.590 g. of citric acid in 15 ml of deionized water to which 2.840 g. of cobalt carbonate was added. The resulting solution was heated to a boil then held there until the solution was clear. The heated solution was then cooled to about room temperature and 6.533 g. of ammonium heptamolybdate was added. After the solution became clear, the solution was diluted to 73.3 ml with deionized water. 118.2 g. of a transitional alumina extrudate which contained 84.6 wt. % solids and the remainder adsorbed water was added to the solution and agitated for several minutes to wet all of the particles. The transitional alumina extrudate was in cylindrical form with an average diameter of 1/16 inch, a median pore diameter as measured by mercury intrusion of 87 Å, a surface area of about 270 m²/g, and a pore volume of about 0.60 cm³/g. After the particles were wetted, the solution was air dried under a hood overnight in an evaporation dish after which it was dried at about 120° C. for four hours and then calcined at 850° F. for two hours in air. The resulting catalyst is Catalyst A, which is used in Example 3 below.

EXAMPLE 2

Isothermal, upflow, all-vapor phase runs were made using a small fixed-bed unit with an intermediate cat naphtha (ICN) feedstock. The naphtha was found to have a 176–313° F. boiling range (5% and 95% distillation boiling points), 740 wppm total sulfur, and 46 bromine number. The olefin saturation in this and all examples herein was determined by using the bromine number test (ASTM 1159). A series of 5 wt % $MoO_3$ catalysts supported on alumina were prepared such that the atomic mole ratio of cobalt to molybdenum varied from 0.0 to 0.86 (0.0–2.4 wt % CoO was added). The $MoO_3$ surface concentrations for these catalysts were between 1.0 and $2.0 \times 10^{-4}$ g $MoO_3/m^2$, the average particle diameters were 1/32 inch, and the median pore diameters were 75–76 Å as measured by mercury intrusion on the fresh catalysts in oxidized form. Each catalyst was sulfided in situ with a 10% $H_2S/H_2$ gas blend at 700–750° F. for 8 hr and cooled to 480° F. before the introduction of the naphtha feedstock. For the tests, the reactor conditions were 527° F., 1000 SCF/B, 100% hydrogen treat gas, 200 psig total inlet pressure and constant space velocity. Table I below lists the selectivity factors (×10) and the Co/Mo atomic mole ratios. The selectivity factor has been described previously in U.S. Pat. No. 4,149,965 and is defined as the ratio of the hydrodesulfurization rate constant to the olefin hydrogenation rate constant:

$$\text{Selectivity Factor} = \frac{\frac{1}{\sqrt{S_p^3}} - \frac{1}{\sqrt{S_f^3}}}{\text{Ln}\left(\frac{Br_f}{Br_p}\right)}$$

where $S_f$, $S_p$ are the feed and product sulfur levels, respectively and $Br_f$ and $Br_p$ are the feed and product bromine number levels, respectively. Table I shows that there is a maximum in selectivity when the Co/Mo mole ratio is greater than 0.0 and less than 0.86.

TABLE I

| Co/Mo Mole Ratio | Selectivity Factor (×10) |
| --- | --- |
| 0.00 | 2.8 |
| 0.20 | 5.5 |
| 0.43 | 6.2 |
| 0.86 | 4.8 |

EXAMPLE 3

Isothermal, upflow, all-vapor phase pilot plant runs were made on an ICN feedstock (160–325° F., 775 wppm total sulfur, 49.2 bromine number) at 525° F., 200 psig total inlet pressure, treat gas to oil of 2000 SCF/B, 100% hydrogen treat gas and constant LHSV. Three catalysts were tested under these conditions: (1) Catalyst A, which was prepared according to Example 1 herein, is a 5.2 wt % $MoO_3$ and 1.5 wt % CoO on an alumina support with a 87 Å median pore diameter and 1/16 inch particle diameter (of this invention); (2) Catalyst B which is a 8.2 wt % $MoO_3$ and 2.4 wt % CoO on an alumina support with a 85 Å median pore diameter and 1/16 inch particle diameter; and (3) Catalyst C which is a commercial RT-2 catalyst that contained about 12 wt % $MoO_3$ and 4 wt % CoO (67 Å median pore diameter and 1/16 inch particle diameter). The Co/Mo mole ratios for all three catalysts ranged from 0.55 to 0.63. A fourth catalyst, Catalyst D, was also tested but the catalyst was first run with a heavy cat naphtha feed (1757 wppm total sulfur and 29.7 bromine number) for a period of 24 days before switching to the above ICN feedstock and conditions. Catalyst D was a commercial KF-742 catalyst with about 15 wt % $MoO_3$, 4 wt % CoO, 72 Å median pore diameter and 1.3 mm particle diameter. All catalysts were sulfided in situ with a 10% $H_2S/H_2$ gas blend at 700° F. for 15 hr and cooled to 200° F. before the introduction of the initial naphtha feedstock. After the introduction of the ICN feedstock, the catalysts were given 4–11 days to line-out. Table II shows the selectivity factor (×10) as a function of the $MoO_3$ surface concentration. Catalyst A, which is a catalyst of this invention, shows a clear enhancement in selectivity when the $MoO_3$ surface concentration is less than $2.9 \times 10^{-4}$ g $MoO_3/m^2$. For the same catalysts, the treat gas to oil ratio was changed to 1000 SCF/B after the completion of the balances at 2000 SCF/B. Again, Catalyst A shows a clear enhancement in selectivity when the $MoO_3$ surface concentration is less than $2.9 \times 10^{-4}$ g $MoO_3/m^2$.

TABLE II

| Catalyst | Treat Gas Ratio SCF/B | Total Days on Oil | Surface Concentration g $MoO_3/m^2$ | Selectivity Factor (×10) |
|---|---|---|---|---|
| A | 2000 | 11 | $1.9 \times 10^{-4}$ | 6.2 |
| B | 2000 | 11 | $2.9 \times 10^{-4}$ | 4.6 |
| C | 2000 | 11 | $4.0 \times 10^{-4}$ | 4.5 |
| D | 2000 | 28 | $5.5 \times 10^{-4}$ | 3.9 |
| A | 1000 | 25 | $1.9 \times 10^{-4}$ | 5.2 |
| B | 1000 | 25 | $2.9 \times 10^{-4}$ | 4.3 |
| C | 1000 | 25 | $4.0 \times 10^{-4}$ | 4.5 |
| D | 1000 | 40 | $5.5 \times 10^{-4}$ | 4.5 |

EXAMPLE 4

The temperature response of three low-metal catalysts was investigated with an ICN feedstock (159–332° F., 922 wppm total sulfur, 58 bromine number) at 200 psig total inlet pressure, 1000 SCF/B treat gas to oil ratio, 100% hydrogen and 500–550° F. The runs were done in isothermal, upflow reactors in all-vapor phase operation. The catalysts were prepared in the laboratory with $MoO_3$ contents ranging from 3.2–5.2 wt % and CoO contents ranging from 0.9–1.5 wt %. Three different alumina supports were used that varied significantly in the median pore diameters. The supports will be referred to as Support X which had a 58 Å median diameter (MPD), Support Y which had a 87 Å MPD, and Support Z which had a 131 Å MPD. The average particle diameters of the catalysts were all less than 1/16 inch so as to isolate the effect of pore diameter with temperature. Each catalyst was sulfided in situ with a 10% $H_2S/H_2$ gas blend at 700° F. for 15 hr and cooled to 200° F. before the introduction of the ICN feedstock. The catalysts and the hydrodesulfurization (HDS) results as a function of temperature are reported in Table III below.

TABLE III

| Catalyst Number | Wt % $MoO_3$ | Wt % CoO | Support | Particle Dia., inch | Median Pore Diameter, Å | Relative LHSV | Temp.° F. | % HDS |
|---|---|---|---|---|---|---|---|---|
| 1 | 4.9 | 1.4 | X | 1/20 | 58 | 1 | 500 | 74.0 |
|  |  |  |  |  |  | 1 | 525 | 90.0 |
|  |  |  |  |  |  | 1 | 550 | 91.8 |
| 2 | 5.2 | 1.5 | Y | 1/32 | 87 | 1.75 | 500 | 75.7 |
|  |  |  |  |  |  | 1.75 | 525 | 86.2 |
|  |  |  |  |  |  | 1.75 | 550 | 95.8 |
| 3 | 3.2 | 0.9 | Z | 1/20 | 131 | 1 | 500 | 72.6 |
|  |  |  |  |  |  | 1 | 525 | 87.6 |
|  |  |  |  |  |  | 1 | 550 | 96.0 |

For both Catalysts 2 and 3, the % HDS increased in an uniform trend from 500 to 550° F. However, for Catalyst 1, only a small increase was observed from 525 to 550° F. indicating a HDS diffusion limitation due to the small average pore size of 58 Å. Therefore, catalysts of the present invention must have median pore diameters greater than 58 Å at moderate operating temperatures.

EXAMPLE 5

Isothermal, upflow, all-vapor phase pilot plant runs were made on a heavy cat naphtha (HCN) feedstock (161–443° F., 2075 wppm total sulfur, 33.9 bromine number) using the three catalysts listed in Table IV below. The two low-metal CoMo catalysts were made with aluminas that had median pore diameters of 87 Å (Support Y) and 131 Å (Support Z) as measured by mercury intrusion on the fresh catalysts in the oxidized form. The third catalyst used was a high-activity, commercial catalyst (KF-752) with a median pore diameter of 77 Å. In order to monitor the performance of the high-activity catalyst at levels similar to the low-metals catalysts, less volume of the high-activity catalyst was loaded into its reactor (by a factor of 4.7). This resulted in the very high space velocities used for this catalyst. Each catalyst was sulfided in situ with a 10% $H_2S/H_2$ gas blend at 700° F. for 15 hr and cooled to 200° F. before the introduction of the HCN feedstock.

The catalysts were first allowed to line-out for 10 days at the base condition of 565° F., 800 SCF/B and 325 psig total inlet pressure. After this period, the temperature was increased to 640° F. and the space velocity was increased by a factor of 2 for each catalyst. Data was taken after one day on oil (Case I). After 8 days, the conditions were switched back to the base conditions. After 4 days, the conditions were changed to 670° F. and 300 SCF/B; again data was taken after one day on oil (Case II). Table IV shows the % HDS results for the three catalysts.

TABLE IV

| Description | Commercial High Activity Catalyst | Low-Metal Catalyst on Support Y | Low-Metal Catalyst on Support Z |
|---|---|---|---|
| Wt % MoO$_3$ | 20.5 | 5.2 | 3.2 |
| Wt % CoO | 4.9 | 1.5 | 0.9 |
| Median Pore Diameter, Å | 77 | 87 | 131 |
| Base LHSV* | 4.7 | 1 | 1 |
| Base Temperature, °F. | 565 | 565 | 565 |
| Base % HDS | 89.2% | 97.6% | 89.4% |
| Case I LHSV* | 9.3 | 2 | 2 |
| Case I Temperature, °F. | 640 | 640 | 640 |
| Case I % HDS | 89.9% | 99.7% | 97.0% |
| Case II LHSV* | 4.7 | 1 | 1 |
| Case II Temperature, °F. | 670 | 670 | 670 |
| Case II % HDS | 63.8% | 97.5% | 89.9% |

*Space velocities on a relative basis.

A comparison of the Base Case to Case I shows that the high-activity catalyst had the smallest increase in HDS level. Comparing the Base Case with Case II shows that there was a dramatic decrease in HDS level for the high-activity catalyst whereas the HDS levels for each low-metal catalyst remained approximately constant. Both Cases I and II indicate that there is a significant HDS diffusion limitation for the high-activity catalyst with the HCN feedstock at temperatures greater than 640° F. Therefore, the median pore diameter should be greater than about 77 Å for higher temperature operations.

EXAMPLE 6

Isothermal, upflow, all-vapor phase pilot plant runs were made using two very similar HCN feedstocks with 161–443° F. boiling range, 1760 (Feed L) to 2075 (Feed H) wppm total sulfur, and 29.7 (Feed L) to 33.2 (Feed H) bromine number. A laboratory-prepared low-metal catalyst and a commercially-produced low-metal, catalyst were compared to the commercial catalysts RT-2 and KF-742. The low-metal catalysts were 1.3 mm asymmetric quadrilobes with 84–87 Å median pore diameters and consisted of 4.2 wt % MoO$_3$ and 1.2–1.3 wt % CoO on alumina. Commercial RT-2 was a 1/16 inch extrudate with 67 Å median pore diameter and about 12 wt % MoO$_3$ and 4 wt % CoO. The KF-742 commercial catalyst was a 1.3 mm quadrilobe with a 72 Å median pore diameter and about 15 wt % MoO$_3$ and 4 wt % CoO. Each catalyst was sulfided in situ with a 10% H$_2$S/H$_2$ gas blend at 700° F. for 15 hr and cooled to 200° F. before the introduction of the naphtha feedstock. For the tests, the reactor conditions were 575° F., 1000 SCF/B, 80% hydrogen/20% methane treat gas and 325 psig total inlet pressure. The space velocities were adjusted such that HDS levels between 96 and 99% were obtained. Table V below summarizes the HDS and olefin hydrogenation (OH) levels along with the calculated selectivity factors. The selectivity factors show that the low-metal catalysts are the most selective for HDS.

TABLE V

| Catalyst | HCN Feed | LHSV (relative) | % HDS | % OH | Selectivity Factor (×10) |
|---|---|---|---|---|---|
| Commercial RT-2 | L | 2.8 | 96.8 | 45.6 | 2.93 |
| Commercial KF-742 | L | 6.4 | 97.8 | 48.9 | 3.17 |
| Lab Low-Metal Catalyst | H | 1 | 99.2 | 58.5 | 3.54 |
| Commercial Low-Metal Catalyst | H | 1 | 99.1 | 57.0 | 3.57 |

EXAMPLE 7

Isothermal, upflow, all-vapor phase pilot plant runs were made on a HCN feedstock (185–458° F., 1760 wppm sulfur, 29.7 bromine number) at 550° F., 325 psig total inlet pressure, treat gas to oil of 1000 SCF/B, 80% hydrogen/20% methane treat gas and constant LHSV. A laboratory-prepared catalyst containing 5.2 wt % MoO$_3$ and 1.5 wt % CoO on an alumina support with a 87 Å median pore diameter was compared to a high-activity commercial CoMo catalyst, KF-742. Both catalysts were sulfided in situ with a 10% H$_2$S/H$_2$ gas blend at 700° F. for 15 hr and cooled to 200° F. before the introduction of the HCN feedstock. A comparison at constant conditions shows that the low-metal catalyst can achieve a sulfur removal level close to 90% while providing significantly less olefin hydrogenation (see Table VI).

TABLE VI

| Catalyst | Wt % MoO$_3$ | Wt % CoO | % HDS | % Olefin Hydrogenation |
|---|---|---|---|---|
| Low-Metal Catalyst | 5.2 | 1.5 | 87.7 | 28.9 |
| Commercial KF-742 | 15 | 4 | 99.6 | 85.4 |

EXAMPLE 8

Isothermal, upflow, all-vapor phase pilot plant runs were made on an ICN feedstock (160–330° F., 978 wppm total sulfur, 49.7 bromine number, 49.1 API, 29 wppm total nitrogen) at 525° F., 200 psig total inlet pressure. 1000 SCF/B 100% hydrogen treat gas and constant LHSV. Table VII shows a summary of the catalysts that were tested. Both Supports a and b were alumina. Each catalyst was sulfided in situ with a 10% H$_2$S/H$_2$ gas blend at 700° F. for 15 hr and cooled to 200° F. before the introduction of the ICN feedstock. After the introduction of the ICN feedstock, the catalysts were given 10–11 days to line-out.

TABLE VII

| Catalyst | Support | MoO$_3$ wt % | CoO wt % | P wt % | Co/Mo Atomic Ratio | Median Pore Diameter, Å | Surface Concentration g MoO$_3$/m$^2$ | Particle Size, Å | Edge Plane Area μmol O$_2$/g MoO$_3$ | Selectivity Factor (×10) |
|---|---|---|---|---|---|---|---|---|---|---|
| E | a | 4.2 | 1.2 | — | 0.55 | 87 | 1.49 × 10$^{-4}$ | 1.3 mm | 761 | 5.1 |

TABLE VII-continued

| Catalyst | Support | MoO$_3$ wt % | CoO wt % | P wt % | Co/Mo Atomic Ratio | Median Pore Diameter, Å | Surface Concentration g MoO$_3$/m$^2$ | Particle Size, Å | Edge Plane Area µmol O$_2$/ g MoO$_3$ | Selectivity Factor (×10) |
|---|---|---|---|---|---|---|---|---|---|---|
| F | a | 6.1 | 1.5 | — | 0.47 | 87 | 1.99 × 10$^{-4}$ | 1.3 mm | 1885 | 5.0 |
| G | b | 5.0 | 1.5 | — | 0.57 | 84 | 1.74 × 10$^{-4}$ | 1/16 in | 2560 | 5.2 |
| H | b | 5.0 | 1.7 | 0.53 | 0.64 | 84 | 1.78 × 10$^{-4}$ | 1/16 in | 1348 | 5.3 |

FIG. 1 hereof shows a plot of the HDS relative activity versus the metal sulfide edge plane area for the catalysts described in Table VII above. The relative HDS activity was calculated for each catalyst based on a weight MoO$_3$ basis using, 1.33 order kinetics and then normalized to the value for the commercial Catalyst E (which was given the value of 100). Since the selectivity factors in Table VII are approximately constant, it is apparent that obtaining metals dispersions higher than about 800 and lower than about 2800 µmol O$_2$/g MoO$_3$ results in catalysts that have higher HDS activity per weight of MoO$_3$ than the base Catalyst E yet retain the same high selectivity. The HDS activity per weight Of MoO$_3$ appears to be maximized between about 1200 and 2000 µmol O$_2$/g MoO$_3$.

EXAMPLE 9

A HCN feedstock (210–450° F., 2200 wppm sulfur, 21.1 bromine number) was processed in a commercial hydrotreating unit with a fixed bed of a new commercial catalyst of this invention (1.3 mm asymmetric quadrilobe, 4.2 wt % MoO$_3$, 1.2 wt % CoO, alumina support with 87 Å median pore diameter). The catalyst was sulfided prior to hydrotreating the HCN feedstock according to a standard commercial practice. Table VIII below summarizes two conditions. Condition A is a case in which the reactor inlet temperature was greater than the calculated inlet dew point temperature whereas Condition B is a case where the reactor inlet temperature was lower than the calculated dew point. From Conditions A to B, the dew point at the inlet changed as a result of increasing the space velocity by a factor of 2.3 and increasing the reactor pressure 45 psig with the hydrogen flowrate approximately constant. The temperature rise for Condition B shows that the product at the reactor outlet was completely vaporized, i.e., the operation went through the dry point in the reactor bed.

Table VIII shows that the HDS levels for the two conditions were close while the olefin hydrogenation was significantly different (83% for Condition A versus 33% for Condition B). This corresponds to a factor of 2.7 increase in the selectivity factor for Condition B versus Condition A. The large olefin hydrogenation reduction resulted in significant octane savings of 3.5 RON and 1.6 MON while the HDS level was maintained at greater than 90%. Note that the road octane loss, (ΔRON+ΔMON)/2, was only 0.65 at 93% HDS. Significant hydrogen consumption savings were also realized from the lower olefin hydrogenation level.

EXAMPLE 10

A HCN feedstock (210–450° F., 2200 wppm sulfur, 21.1 bromine number) was processed in a commercial hydrotreating unit with a fixed bed of a new commercial catalyst of this invention (1.3 mm asymmetric quadrilobe, 4.2 wt % MoO$_3$, 1.2 wt % CoO, alumina support with 87 Å median pore diameter). The catalyst was sulfided prior to hydrotreating the HCN feedstock according to a standard commercial practice. Table IX below summarizes ten conditions that were run over two months in the commercial unit. The total reactor pressure during this time was 280–350 psig while the LHSV varied by a factor of 2.85 over a base level. Table IX also lists the % HDS and % OH which are values that were averaged over the period at each condition.

TABLE VIII

| Condition # | Gas to Oil ratio SCF/B | Inlet Temp., ° F. | Inlet Dew Point, ° F. | Reactor ΔTemp, ° F. | T$_{DP}$/T$_{IN}$ (R/R) | % HDS | % Olefin Hydro. | Selectivity Factor (×10) | RON Loss | MON Loss |
|---|---|---|---|---|---|---|---|---|---|---|
| A | 2000 | 525 | 480 | 115 | 0.954 | 97 | 83 | 1.0 | 4.5 | 1.9 |
| B | 950 | 530 | 545 | 45 | 1.015 | 93 | 33 | 2.7 | 1.0 | 0.3 |

TABLE IX

| Condition Number | Gas to Oil Ratio, SCF/B | Inlet Temp. °F. ($T_{IN}$) | Inlet Dew-Point Temp. °F. ($T_{DP}$) | $T_{DP}/T_{IN}$ (RIR) | % HDS | % OH | Selectivity Factor (×10) |
|---|---|---|---|---|---|---|---|
| 1 | 2000 | 505 | 480 | 0.974 | 94 | 75 | 0.9 |
| 2 | 2000 | 525 | 480 | 0.954 | 97 | 83 | 1.0 |
| 3 | 1500 | 525 | 505 | 0.980 | 97 | 68 | 1.5 |
| 4 | 1500 | 517 | 507 | 0.990 | 97 | 58 | 2.0 |
| 5 | 1450 | 510 | 515 | 1.005 | 93 | 42 | 2.0 |
| 6 | 1000 | 525 | 540 | 1.015 | 93 | 45 | 1.8 |
| 7 | 820 | 550 | 565 | 1.015 | 93 | 46 | 1.8 |
| 8 | 950 | 530 | 545 | 1.015 | 93 | 33 | 2.7 |
| 9 | 760 | 555 | 560 | 1.005 | 95 | 38 | 2.8 |
| 10 | 890 | 535 | 550 | 1.015 | 95 | 34 | 3.2 |

Conditions 1–3 above are at $T_{DP}/T_{IN}$ ratios below 0.990 and show low selectivity values of 1.5 or less. Conditions 4–10 are at $T_{DP}/T_{IN}$ ratios of 0.990 and greater and show selectivity values of 1.8 to 3.2. These data show that for a variety of commercial unit conditions using a catalyst of this invention, high selectivity values are obtained as long as the $T_{DP}/T_{IN}$ ratio is greater than or equal to 0.990.

EXAMPLE 11

A sample of catalyst of this invention and a conventional catalyst was used for this example. The catalyst of this invention was comprised of 4.2 wt. % $MoO_3$, 1.2 wt. % CoO, on an alumina support having a median pore diameter of about 87 Å. The conventional catalyst was a catalyst designated KF-742 and available from Akzo Nobel, and was comprised of about 15 wt. % $MoO_3$, 4 wt. % CoO on an alumina support having a median pore diameter of about 72 Å. Both catalysts were tested in a 1.3 mm asymmetric quadrilobe size. Each catalyst was sulfided in situ with a 10% $H_2S/H_2$ gas blend for approximately 16 hrs at two holding temperatures, 450° F. and 700° F., and cooled to 200° F. before introduction of naphtha feed. All tests were preformed in isothermal, upflow, all vapor phase pilot units. The two stacked bed tests and the full charge of RT-225 and KF-742 were tested with a Baton Rouge heavy cat naphtha feed having a 162–475° F. boiling range, 2321 wppm total sulfur, and 23.5 bromine number. Two stacked bed volume percent loadings were compared, 87/13 and 74/26, of RT-225 (inlet)/KF-742 (outlet). All tests were performed at reactor conditions of 500/530/560° F., 2600 scf/b, 100% hydrogen treat gas and 300 psig total inlet pressure. Space velocity was held constant at 6.5 LHSV, FIG. 1 plots % HDS versus % OS from the four runs. Selectivity is shown directly by plotting percent HDS versus the percent olefin saturation.

FIG. 1 show equivalent selectivity for the stacked beds when compared with RT-225. And significantly improved selectivity for the stacked beds versus KF-742 alone. Equivalent selectivity means that the catalysts will give similar olefin saturation at a constant HDS level. An example taken from FIG. 1 shows both the stacked beds and RT-225 are saturating about 28% olefins at 95% HDS while KF-742 saturates approximately 35%.

Figure 2:
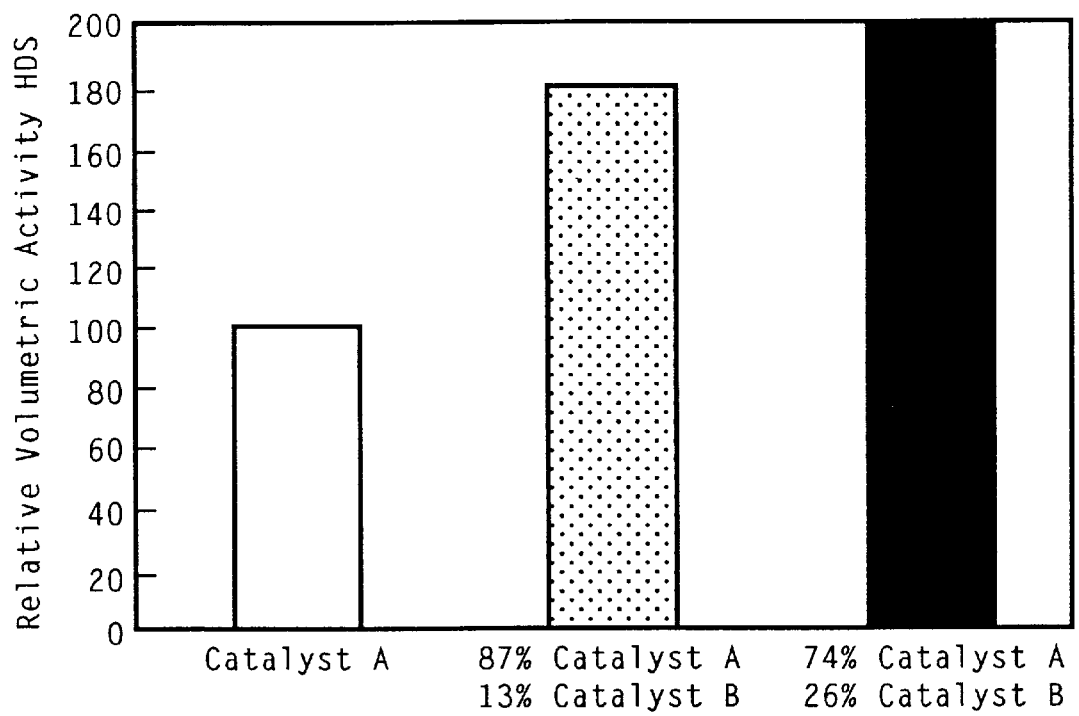
FIG. 2 is a bar chart showing relative volumetric activity for hydrodesulfurization for the catalyst systems of Example 11 herein wherein one catalyst system is a bed of only the catalyst of this invention, a second catalyst system is a bed composed of 87 vol. % of the catalyst of this invention and 13 vol. % of the conventional catalyst KF-742; and a third catalyst system which is a bed composed of 74 vol. % of catalyst of this invention and 26 vol. % of the conventional catalyst KF-742.

FIG. 2 shows stacked catalyst beds containing RT-225 and KF-742 with significant HDS activity improvements over the reference case of a 100% RT-225 loaded reactor. The relative volumetric activity for the 87 vol. % RT-225/13 vol. KF-742 stacked bed was 180 and for the 74 vol. % RT-225/26 vol. % KF-742 stacked bed 200. KF-742 was added as the second (outlet) catalyst in a stacked bed configuration with HDS selective RT-225 in the inlet, to increase the overall HDS performance of the catalyst system.

What is claimed is:

1. A two stage process for hydrodesulfurizing a naphtha feedstock, which process comprises:
   1) reacting said feedstock in a first reaction stage under hydrodesulfurization conditions in contact with a catalyst comprised of:
      (a) about 1 to 10 wt. % $MoO_3$; and
      (b) about 0.1 to 5 wt. % CoO; and
      (c) a Co/Mo atomic ratio of about 0.1 to 1.0; and
      (d) a median pore diameter of about 75 Å to 175 Å; and
      (e) a $MoO_3$ surface concentration in g $MoO_3/m^2$ of about $0.5 \times 10^{-4}$ to $3 \times 10^{-4}$; and
      (f) an average particle size diameter of less than about 2.0 mm; and
      (g) a metal sulfide edge plane area of from about 761 to 2800 $\mu$mol oxygen/g $MoO_3$ as measured by oxygen chemisorption; and
      (h) an inorganic refractory support material; and
   ii) passing the reaction product of the first stage to a second stage, also operated under hydrodesulfurization conditions in contact with a catalyst comprised of at least one Group VIII metal selected from the group consisting of Co and Ni, and at least one Group VI metal selected from the group consisting of Mo and W, on an inorganic oxide support material.

2. The process of claim 1 wherein the amount of $MoO_3$ is from about 2 to 8 wt. %, and the amount of CoO is from about 0.5 to 4 wt. %, and the inorganic support material is selected from the group consisting of alumina, silica, and silica-alumina.

3. The process of claim 2 where the Co/Mo atomic ratio is from about 0.20 to about 0.80.

4. The process of claim 3 wherein the $MoO_3$ surface concentration is from about $0.75 \times 10^{-4}$ to about $2.5 \times 10^{-4}$.

5. The process of claim 1 wherein the catalyst has a metal sulfide edge plane area of from about 800 to 2800 $\mu$mol oxygen/g $MoO_3$ as measured by oxygen chemisorption.

6. The process of claim 1 wherein the process unit is operated such that the inlet temperature of the feedstock to the reaction unit is below the dew point of the feedstock and 100% of the feedstock becomes vaporized in the catalyst bed.

7. The process of claim 4 wherein the process unit is operated such that the inlet temperature of the feedstock to the reaction unit is below the dew point of the feedstock and 100% of the feedstock becomes vaporized in the catalyst bed.

8. A process for hydrodesulfurizing naphtha feedstreams without excessive olefin saturation, which process comprises:

feeding a naphtha feedstream to a hydrodesulfurization process unit containing a bed of hydrodesulfurization catalyst, which catalyst is comprised of:
(a) an inorganic refractory support material; and
(b) about 2 to 8 Wt. % $MoO_3$; and
(c) about 0.5 to 4 wt. % CoO; and
(d) a Co/Mo atomic ratio of about 0.20 to 0.80; and
(e) a median pore diameter of about 75 Å to 175 Å; and
(f) a $MoO_3$ surface concentration in g $MoO_3/M^2$ of about $0.75 \times 10^{-4}$ to $2.5 \times 10^{-4}$; and
(g) an average particle size diameter of less than about 1.6 mm; and
(h) a metal sulfide edge plane area of from about 761 to 2800 μmol oxygen $MoO_3$ as measured by oxygen chemisorption; and
wherein the process unit is operated such that the inlet temperature of the feedstock to the reaction unit is below the dew point of the feedstock and 100% of the feedstock becomes vaporized in the catalyst bed.

9. The process of claim 8 wherein the amount of $MoO_3$ is from about 4 to 6 wt. %,nd the amount of CoO is from about 1 to 3 wt. %, and the inorganic support material is selected from the group consisting of alumina, silica, and silica-alumina.

10. The process of claim 9 where the Co/Mo atomic ratio is from about 0.25 to about 0.72.

11. The process of claim 10 wherein the median pore diameter is from about 80 Å to about 150 Å.

12. The process of claim 11 wherein the $MoO_3$ surface concentration is from about $1 \times 10^{-4}$ to about $2 \times 10^{-4}$ g $MoO_3/m^2$.

13. The process of claim 8 wherein the catalyst has a metal sulfide edge plane area of from about 1000 to 2200 μmol oxygen/g $MoO_3$ as measured by oxygen chemisorption.

* * * * *